United States Patent [19]

Février et al.

[11] Patent Number: 4,959,837
[45] Date of Patent: Sep. 25, 1990

[54] DOPED OPTICAL FIBER LASER AMPLIFIER

[75] Inventors: Hervé Février, Massy; Josiane Ramos, Bondoufle; Jacques Auge, Saint-Cheron; Jean-Francois Marcerou, Caderousse; Bernard Jacquier, Marcoussis; Jean-Claude Gàcon, Neuville S/Saone, all of France

[73] Assignee: Societe Anonyme dite: Compagnie Generale d'Electricite, Paris, France

[21] Appl. No.: 434,192

[22] Filed: Nov. 13, 1989

[30] Foreign Application Priority Data

Nov. 10, 1988 [FR] France ................ 88 14711

[51] Int. Cl.$^5$ ............................... H01S 3/30
[52] U.S. Cl. ........................ 372/6; 350/96.15; 350/96.34; 372/39; 372/41
[58] Field of Search .............. 372/39, 41, 6; 350/96.15, 96.34

[56] References Cited

U.S. PATENT DOCUMENTS

| | | | |
|---|---|---|---|
| 4,637,025 | 1/1987 | Snitzer | 372/6 |
| 4,782,494 | 11/1988 | Pollack et al. | 372/69 |
| 4,910,737 | 3/1990 | Payne et al. | 372/6 |

FOREIGN PATENT DOCUMENTS 0313209  4/1989  European Pat. Off. ............ 372/6
8701246  2/1987  United Kingdom.

OTHER PUBLICATIONS

Optics Letters, vol. 12, No. 11, Nov. 1987, pp. 888-890; E. Desurvire et al.: "High-Gain Erbium-Doped Traveling-Wave Fiber Amplifier".

Technical Digest of the 13th European Conference on Optical Communication, vol. 3, pp. 89-94, 1987; D. Payne et al.: "Rare-Earth Doped Fibre Lasers and Amplifers".

Technical Digest of the 14th European Conference on Optical Communication, Part 1, Sep. 1988, pp. 62-65; B. Ainslie et al.: "Fabrication and Optimisation of the Erbium Distribution in Silica Based Doped Fibres".

Journal of Physics E. Scientific Instruments, vol. 19, No. 2, Feb. 1986, p. 89, Bristol, GB: "New Lasers Invented".

*Primary Examiner*—Leon Scott, Jr.
*Attorney, Agent, or Firm*—Sughrue, Mion, Zinn, Macpeak & Seas

[57] ABSTRACT

An erbium-doped fiber laser amplifier (1), characterized by the fact that said fiber (3) is doped to a concentration lying in the range 5 ppm to 50 ppm, that the length of said fiber lies in the range 250 m to 30 m depending on the selected concentration of doping, and that the radial position of the doped zone substantially coincides with the energy maximum of the set of propagation modes in said fiber at the pumping wavelength.

2 Claims, 4 Drawing Sheets

DOPED OPTICAL FIBER LASER AMPLIFIER

The present invention relates to a doped optical fiber laser amplifier applicable, in particular, to optical fiber telecommunications systems.

Such an amplifier is intended to receive an optical signal of wavelength λs and a pump signal of wavelength λp which are combined by a coupler at the inlet to a doped amplifying fiber. Erbium doping is well suited to optical amplification in the third telecommunications window about 1.55 μm.

An amplifier is characterized by its net gain G expressed in decibels as follows:

$$G(dB) = 10 \times \log (P_{output\ signal}/P_{input\ signal}).$$

The net gain of the amplifier is the difference between its raw gain based on stimulated emission, and its losses at the signal wavelength.

It should be observed that there exists a pumping power for which a saturation plateau is reached in amplification net gain. This "saturation" pumping power is the pumping power required to obtain maximum gain for a fixed length of fiber. It is therefore important that this power should be as low as possible, i.e. that the efficiency of the process should be maximized. A good measure of the efficiency of the process is thus the net gain relative to the required pumping power, giving a value g expressed in dB/mW. This pumping power may be relatively poorly used, if for example, the fiber exhibits loss at said wavelength due to a cause other than absorption by the rare earth.

Studies on amplification by erbium-doped fibers have been published in the following documents:

Reference 1: "Optimal pumping of erbium-doped-fiber optical amplifiers," R. I. Laming, L. Reekie, D. N. Payne, P. L. Schrivener, F. Fontana, A. Righetti, 14th European Conference on Optical communication, 11-15 Sept. 1988, Brighton, UK; and Reference 2: "High-gain erbium-doped travelling-wave fiber amplifier," E. Desurvire, J. R. Simpson, P. C. Becker, Optics Letters, Vol. 12 (1987), pp. 888-890.

The following document lists methods of making the fibers used in references 1 and 2, together with their characteristics:

Reference 3: "Fabrication of $Al_2O_3$ co-doped optical fibers by a solution doping technique," S. B. Poole, 14th European Conference on Optical Communication, 11-15 Sept. 1988, Brighton, UK.

Prior optical amplifiers comprise an optical fiber which is relatively highly doped with erbium (typically several hundreds of ppm), with the fiber being typically about 3 meters long, and with a maximum length being about 13 meters.

The object of the present invention is to provide an optical fiber laser amplifier having higher gain than prior amplifiers for given pumping power, i.e. providing improved efficiency in the amplification process.

The present invention provided an erbium-doped fiber laser amplifier, characterized by the fact that said fiber is doped to a concentration lying in the range 5 ppm to 50 ppm, that the length of said fiber lies in the range 250 m to 30 m depending on the selected concentration of doping, and that the radial position of the doped zone substantially coincides with the energy maximum of the set of propagation modes in said fiber at the pumping wavelength.

In a particular embodiment, the radial position of the doped zone lies at a distance from the center of the fiber in the range 0.6 R to 0.85 R, where R is the radius of the core of said fiber.

Other characteristics and advantages of the present invention appear from reading the following description of embodiment given by way of non-limiting example. In the accompanying drawings.

Figure 1:
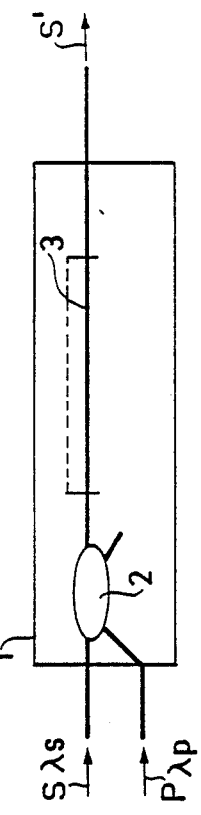
FIG. 1 is a theoretical diagram of a fiber laser amplifier.

FIG. 1 is a diagram showing an optical single S of wavelength λs and a pumping signal P of wavelength λp at the input to an amplifier 1. The two signals S and P are injected via a coupler 2 at the input to an amplifying doped fiber 3 of the invention. At the output from the amplifier 1, there is an amplified signal S' of wavelength λs.

The optical amplifier is made from a 140 meter (m) long fiber in which the vitreous matrix of the core is based on silica having oxides of the type $GeO_2$ and $P_2O_5$ added thereto. It is doped with erbium to a concentration of 10 ppm (parts per million), with this figure being an overall measurement obtained from the spectral attenuation curve.

In order to make a preform for such a fiber, a conventional "MCVD" method is used to deposit the cladding layers and the first core layers. After vitrification of the core layer corresponding to the location where it is desired that a doped layer should be obtained, it is preferable to continue by implementing the method described in French patent application No. 87 14 286, of Oct. 16, 1987.

A layer of erbium is deposited on the tube as already obtained by nebulization, using the following steps:

a liquid doping liquor is made containing erbium in a volatile liquid carrier;

the liquid is nebulized to obtain a doping spray of droplets in suspension in a carrier gas;

a spray feed tube is placed inside the said tube, said spray feed tube having an inlet end outside the said tube and penetrating into the said tube via a first end thereof and extending to an outlet end in the space inside the said tube;

feeding the inlet end of the spray feed tube so that it delivers the doping spray from its outlet end inside the said tube in such a member that the erbium is deposited by droplets of the spray being deposited on the inside surface of the said tube;

displacing the spray feed tube in controlled manner along the said tube while maintaining the spray feed thereto so that the outlet end of the spray feed tube runs along the length of the said tube and erbium deposited over the entire inside surface thereof;

drying the inside surface after deposition in order to evaporate off the carrier liquid;

depositing a glass covering layer over the inside surface of the said tube after the surface has dried; and heat-diffusion, i.e. heating the said tube to a temperature which ensures that the erbium diffuses into the glass.

The following core layer is then deposited and the preform is made by conventional techniques. Deposition by means of nebulization is appropriate for erbium since erbium is a dopant that is difficult to put into the vapor phase. All of the other stages in the manufacture of the fiber are in accordance with the conventional method referred to as "MCVD" deposition.

The above-described method makes it possible to incorporate the erbium in a preform from one end only of the preform without dismounting the tube after it has been mounted in a glassmaker's lathe, thereby avoiding any risk of pollution from the other end while the erbium is being incorporated, assuming that the other end has previously been polluted. In addition, it makes it possible to obtain a highly uniform longitudinal distribution of the erbium, and finally, when the tube is destined to be collapsed in order to constitute a preform from which the optical fiber is drawn, it makes it possible to obtain a doped fiber very cheaply that nevertheless has very good optical qualities and very good erbium incorporation qualities.

The fiber of the invention doped with erbium at a concentration of 10 ppm and having a length of 140 m is subjected to pumping radiation at a wavelength of 514.5 nanometers (nm). For a pumping power $P_p$ of 45 mW, the resulting net gain G is 16 dB; i.e. a relative gain g of 0.35 dB/mW.

By way of comparison, the amplifying fiber in above-mentioned prior art reference 1 having a matrix of $SiO_2/Al_2O_3$ doped with 0.3% by weight erbuim oxide and having a length of 2 m provides a net gain G of 16 dB, but at a pumping power $P_p$ of 100 mW, i.e. a relative gain g of 0.16 dB/mW.

The amplifying fiber of above-mentioned prior art reference 2 comprises an $SiO_2/Al_2O_3$ matrix doped with erbium at about 70 ppm and has a length of 13 m. It provides a net gain G of 22 dB for a pumping power $P_p$ of 100 mW, i.e. a relative gain g of 0.22 dB/mW.

Quite surprisingly, the relative gain g which represents the efficiency of the amplifying process is much higher in fibers of the invention than in prior art fibers.

It cannot be simply assumed that the amplification gain is established by the product of the length of the amplifier multiplied by the concentration of erbium. Most unexpectedly, the present invention shows that it is much more advantageous to use a long and lightly doped fiber as the amplifier with length not constituting a drawback for this type of application. This result is important since in industrial versions of fiber amplifiers the pumping sources are laser diodes for which the available power injected into the fiber is smaller than that which is available from the pumping lasers used in the laboratory, and it is of fundamental importance to obtain maximum efficiency in the amplifier.

Figure 2:
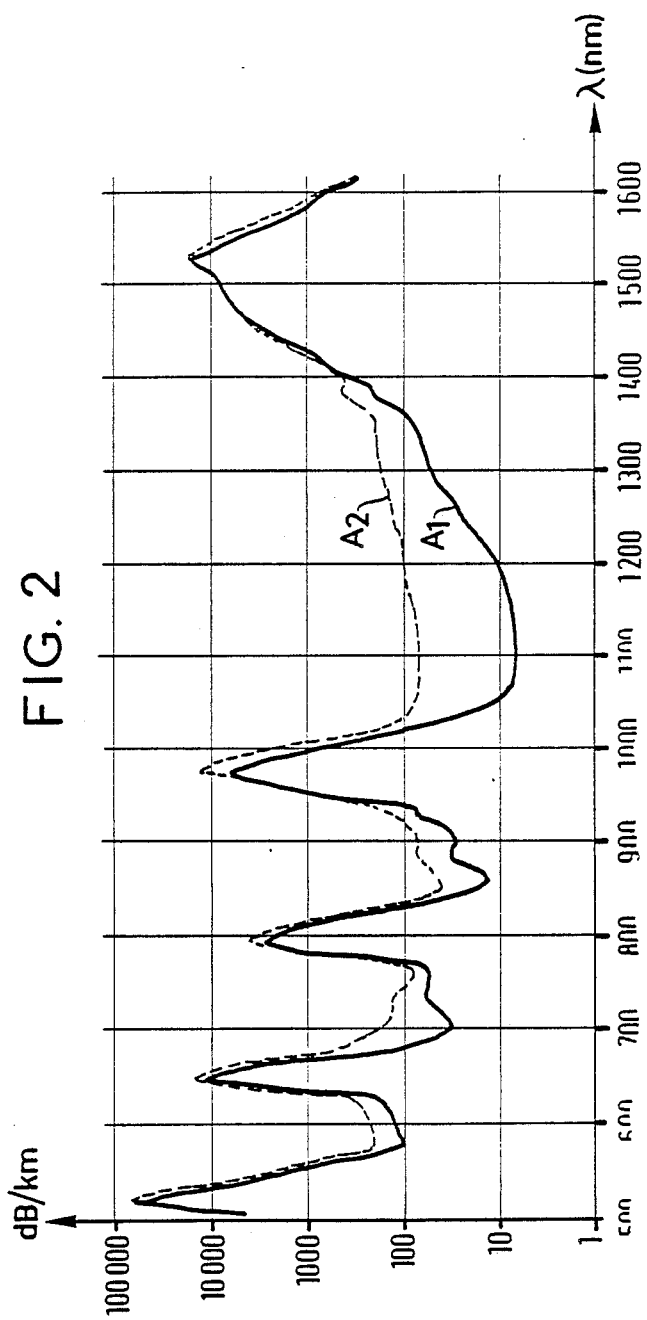
FIG. 2 is a plot of two spectral attenuation curves $A_1$ and $A_2$ (in dB/km) for two prior art fibers.

FIG. 2 shows spectral attenuation curves $A_1$ and $A_2$ of two prior art optical fibers: loss is plotted on a logarithmic scale in dB/km as a function of wavelength $\lambda$ in nanometers. These curves are taken from above-mentioned prior art reference 3. Curve $A_1$ corresponds to a fiber in which the vitreous matrix of the core is based on $SiO_2/Al_2O_3$ and is doped with about 300 ppm of erbium. Curve $A_2$ corresponds to a fiber in which the vitreous matrix of the core is based on $SiO_2/GeO_2$ and is doped with about 200 ppm of erbium.

Figure 3:
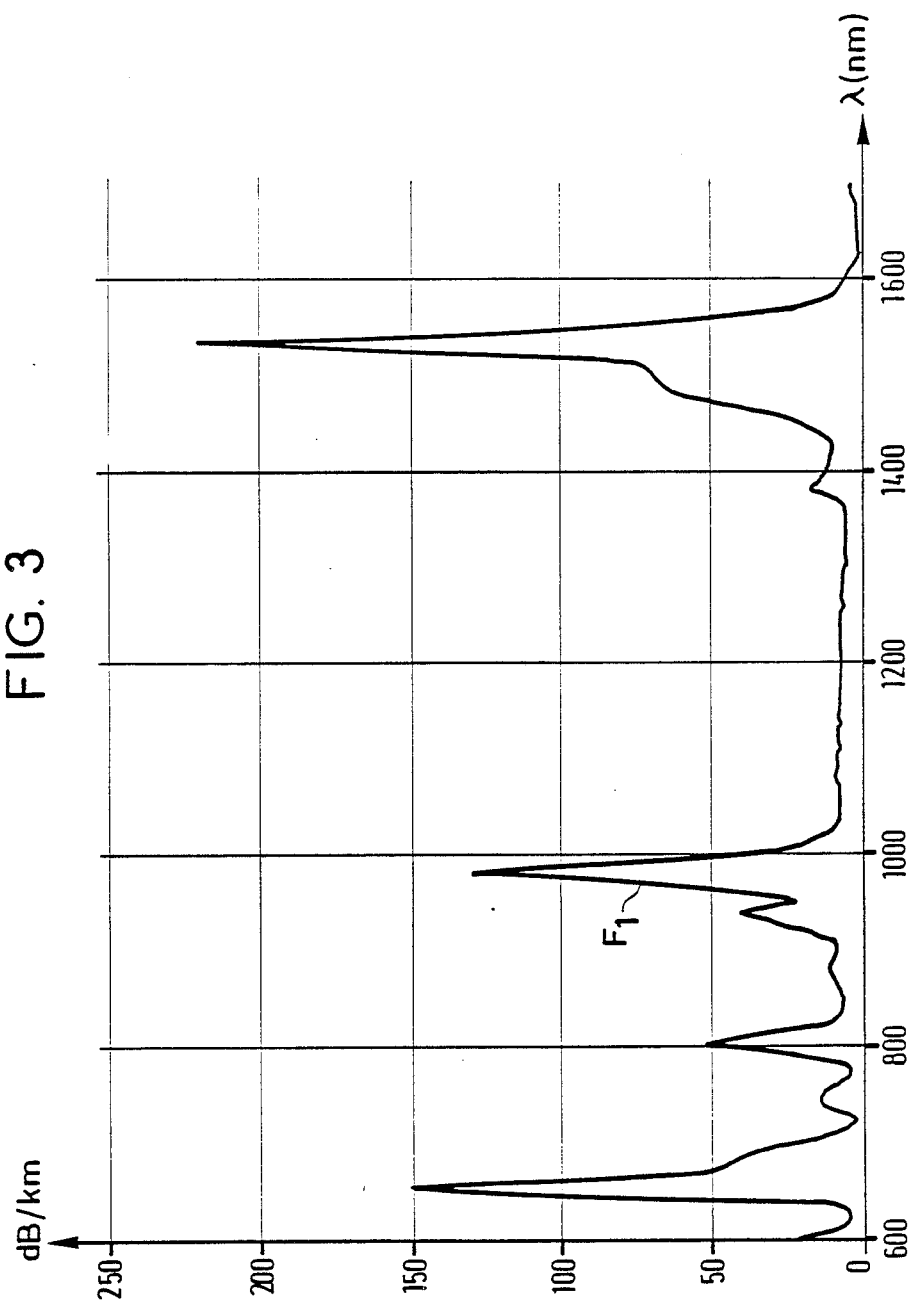
FIGS. 3 and 4 are plots of spectral attenuation curves $F_1$ and $F_2$ (in dB-km) for two fibers in accordance with the invention.
Figure 4:
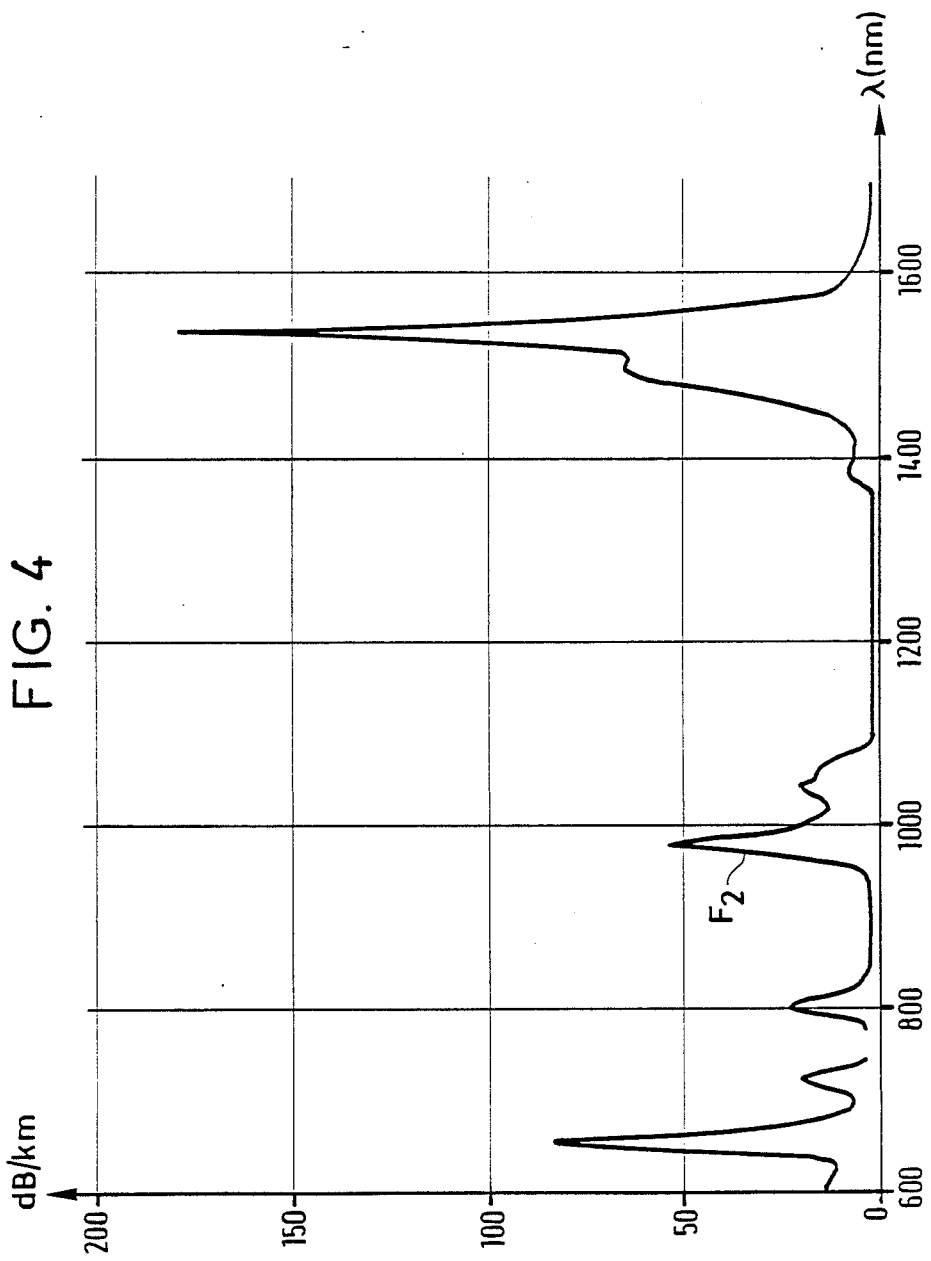

FIGS. 3 and 4 are similar attenuation curves $F_1$ and $F_2$ (loss is plotted on a linear scale) for two types of fiber of the invention doped with about 10 ppm of erbium. Their vitreous matrices are similar to those of the fiber corresponding to curve $A_2$ of the prior art.

If the curves $A_1$, $A_2$, $F_1$, and $F_2$ are compared, the following observations can be made:

In the curves $F_1$ and $F_2$, the absorption peaks of the erbium ions are "normal" compared with the information given in the literature and the optical quality of the two fibers is excellent since the continuous base line away from the absorption peaks is very low having minima around 1 dB/km to 2 dB/km.

For the curve $A_2$ corresponding to a fiber whose basic core material is close to that of the fibers of the invention, the attenuation minimum is about 70 dB/km, which bears witness to the disturbance caused by the high concentration doping of the vitreous matrix of the fiber.

As for curve $A_1$, the minimum is around 7 dB/km, which is considerably higher than the minima for fibers of the invention: in addition, the zone from 1200 nm to 1350 nm in which an increase in attenuation can be observed is highly suspect since it dose not correspond to absorption by erbium. Finally, it may be suspected that broadening of the absorption peaks is because the erbium ions are incorporated non-uniformly in their environment.

Figure 5:
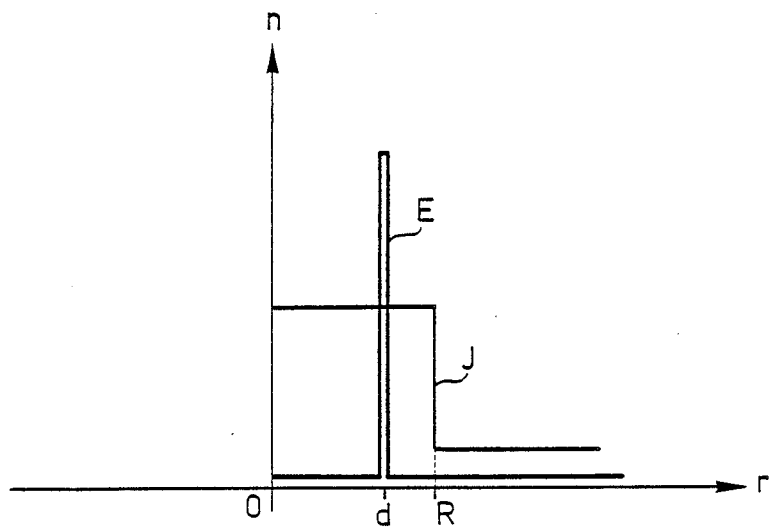
FIG. 5 shows the variation in optical index n in the core of the fiber as a function of radius R, and shows up the zone in which the erbium-doped layer is located.

Another fiber of the invention was then made of the same length and the same concentration of doping, but accurately selecting the location of the erbium doping in the core of the fiber. This can readily be done when implementing the method outlined above. The erbium was localized between the second and third layers of the core which implies a radial position d within the core of radius R of about 0.8 R for the doping layer. In FIG. 5, curve J represents the profile of the refractive index n of the fiber as a function of radium r. Curve E corresponds to the profile of erbium ion concentration.

For a pumping power of 45 mW a net gain G of 18 dB was obtained for a relative gain g of 0.40 dB/mW, which is even better than in the preceding examples.

It can thus be seen that independently of the conditions under which the pumping beam is coupled to the fiber, the fact of using a long fiber in accordance with the invention is favorable to the incident energy being distributed over all of the four modes guides by the fiber, which modes at $\lambda = 514.5$ nm are the following:

$LP_{01}$, $LP_{11}$, $LP_{21}$, $LP_{02}$

Most of the pumping energy is spread over the higher order modes ($LP_{11}$, $LP_{21}$, $LP_{02}$). Given the radial distributions of this energy, the position of the rare earth coincides with the field intensity maximum of the three above-mentioned modes, since the azimuth configurations of these modes are easily taken into account from a qualitative point of view. The tolerance range for such coincidence lies between 0.6 R and 0.85 R. This provides particularly favorable interaction between the pumping beam and the erbium ions, thereby obtaining population invention efficiently.

Finally, the radial distribution of the field of the signal beam is relatively spread out by virtue of the optogeometrical parameters of the fiber, which means that the interaction between the excited ions and the signal beam is relatively good. The overall criterion is a compromise between these two interactions: firstly the interaction between the pumping beam and the population of erbium ions, and secondly the interaction between the population of excited erbium ions and the signal beam.

Naturally the invention is not limited to the embodiments described above. Thus the concentration of the erbium doping in the fiber may lie in the range 5 ppm to 50 ppm, with the length of the fiber then being selected in the range 250 m to 30 m as a function of the doping concentration so as to obtain a maximum net gain G. With all other conditions fixed elsewhere, there exists an optimum for the length of the fiber because of the competition between phenomenon of absorption which applies both to the pumping wavelength and to the signal wavelength and the phenomenon of amplification which applies to the signal wavelength only.

We claim:

1. An erbium-doped fiber laser amplifier, characterized by the fact that said fiber is doped to a concentration lying in the range 5 ppm to 50 ppm, that the length of said fiber lies in the range 250 m to 30 m depending on the selected concentration of doping, and that the radial position of the doped zone substantially coincides with the energy maximum of the set of propagation modes in said fiber at the pumping wavelength.

2. An optical fiber laser amplifier according to claim 1, characterized by the fact that the radial position of the doped zone lies at a distance from the center of the fiber in the range 0.6 R to 0.85 R where R is the radius of the core of said fiber.

* * * * *